(No Model.)

G. DRAPER.
SPINDLE BEARING.

No. 253,019. Patented Jan. 31, 1882.

Fig. 1.

Fig. 3.   Fig. 2.

Witnesses.
B. J. Noyes.
L. F. Connor.

Inventor.
George Draper,
by Crosby & Gregory Attys

UNITED STATES PATENT OFFICE.

GEORGE DRAPER, OF HOPEDALE, MASSACHUSETTS.

SPINDLE-BEARING.

SPECIFICATION forming part of Letters Patent No. 253,019, dated January 31, 1882.

Application filed July 29, 1881. (No model.)

*To all whom it may concern:*

Be it known that I, GEORGE DRAPER, of Hopedale, county of Worcester, State of Massachusetts, have invented an Improvement in Spindle-Bearings, of which the following description, in connection with the accompanying drawings, is a specification.

This invention in lateral or side bearings for rotating spindles is shown embodied in a bolster for a ring-spinning frame.

My invention has for its object the production of a laterally-yielding bearing for rotating spindles in such manner as to overcome that objectionable looseness or improper fit or partial want of contact between the spindle and its lateral bearing as now commonly made.

The lateral or side bearings for rotating spindles as commonly made before my invention were ordinarily produced by boring a piece of metal of a length equal to the length desired for the said bearing. The hole so bored for the reception of the rotating spindle is necessarily somewhat larger than the spindle; but with the most skillful boring it is impossible to get and maintain the proper contact between the spindle and long bearing throughout the length of the latter in all the different positions of the spindle.

By experiment I have found that a proper fit or contact between the revolving spindle and its lateral or side bearing, wherever located, may be maintained and objectionable looseness of fit or want of proper contact be completely overcome by dividing the laterally-yielding side bearing into several short sections and inclosing said sections within a yielding or elastic packing or jacket, preferably a braided or woven or knitted tube. Sectional lateral or side bearings such as described materially lessen the jar of the spindle, and enable it to be run more steadily and be better lubricated, so that the spindle and bearing are made more durable and lasting than when the lateral bearing is made as one long piece.

Figure 1 represents in elevation and partial section a spindle-rail, spindle, sleeve-whirl thereon, and tubular support, of ordinary construction, with my improved sectional lateral or side bearing inclosed within an elastic or yielding packing; Fig. 2, a perspective of one of the sections of the bolster or bearing, and Fig. 3 a modification to be referred to.

The rail $a$, spindle $b$, sleeve-whirl $c$, tubular support $d$, and hook $e$ are and may be of any usual construction.

The lateral or side bearing for the spindle is composed of several sections, 2, herein shown as independent short rings, or they may be segments, as in Fig. 3, inclosed within an elastic or yielding packing or jacket, $f$, made preferably of a braided or woven or knitted tube, drawn over the same and secured to the grooved neck of the upper piece, 2, by means of a cord or wire, 3, and to the part $h$ of the foot-piece in the same manner. The lower end of the spindle rests upon and the weight of the spindle is borne by the end bearing or foot-piece, $g$, preferably made as a small perforated disk, supported upon the part $h$, the said foot-piece $g$, or both it and the part $h$, being free to move laterally as the loaded spindle seeks its center of rotation, as is well understood with relation to the Rabbeth spindles. The employment of sectional lateral or side bearings insures that portions of the sectional lateral bearings will be pressed against portions of the spindle within and opposite the said sections, and the latter by their contact with the spindle will support it, thus obviating such want of contact of the spindle and the interior of the lateral bearing-sections as would cause chattering or unsteadiness in the rotation of the spindle.

To enable oil to flow between the spindle and packing, the sections 2 are notched at $l$, Fig. 2.

In Fig. 3 I have shown the bearing-sections made longer than in Fig. 2, and have divided them longitudinally to form segments, each having its concaved face kept properly pressed closely against the side of the spindle by the elastic or yielding packing, which will surround the said segments as the sectional pieces or rings are surrounded in Fig. 1.

I desire it to be understood that the novel sectional lateral or side bearings may be applied for use in spinning-machines of any usual construction, so I do not limit the use of such lateral or side bearings to the particular class of spindle herein shown.

I do not claim a bearing composed of an outer shell and removable lining-pieces, which do not yield laterally to permit lateral movement of the spindle; nor do I claim a bearing composed of metal coiled to form a cylinder, for in both such forms the action is entirely unlike that described as existing with relation to my invention.

I claim—

1. The tubular support $d$ and the sectional lateral or side spindle-bearing and spindle, combined with the elastic or yielding packing for the said lateral sectional bearing, the packing being interposed between the tubular support and sectional lateral bearing, substantially as described.

2. The spindle and tubular support, combined with the sectional bearing therefor, movable step, and elastic or yielding packing between the said sectional lateral bearing and tubular support, substantially as described.

In testimony whereof I have signed my name to this specification in the presence of two subscribing witnesses.

GEORGE DRAPER.

Witnesses:
F. J. DUTCHER,
ARTHUR H. BALL.